US 10,530,272 B2

(12) United States Patent
Barupati et al.

(10) Patent No.: US 10,530,272 B2
(45) Date of Patent: Jan. 7, 2020

(54) VOLTAGE SOURCE CONVERTER WITH IMPROVED OPERATION

(71) Applicant: ABB SCHWEIZ AG, Baden (CH)

(72) Inventors: Praveen Kumar Barupati, Ludvika (SE); Hongbo Jiang, Borlänge (SE); Alireza Nami, Västerås (SE); Sasitharan Subramanian, Ludvika (SE); Vishal Vekhande, Chennai (IN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/462,661

(22) PCT Filed: Dec. 21, 2016

(86) PCT No.: PCT/EP2016/082109
§ 371 (c)(1),
(2) Date: May 21, 2019

(87) PCT Pub. No.: WO2018/113944
PCT Pub. Date: Jun. 28, 2018

(65) Prior Publication Data
US 2019/0348925 A1 Nov. 14, 2019

(51) Int. Cl.
*H02M 7/5387* (2007.01)
*H02M 7/483* (2007.01)
*H02M 7/487* (2007.01)

(52) U.S. Cl.
CPC ......... *H02M 7/5387* (2013.01); *H02M 7/483* (2013.01); *H02M 7/487* (2013.01); *H02M 2007/4835* (2013.01)

(58) Field of Classification Search
CPC .... H02M 7/5387; H02M 7/483; H02M 7/487; H02M 7/49; H02M 2007/4835; H02M 2001/007; H02M 5/4585; H02J 3/36
See application file for complete search history.

(56) References Cited

U.S. PATENT DOCUMENTS 10,063,134 B2 *  8/2018  Subramanian ..........  H02M 7/49
2013/0258726 A1 * 10/2013  Mukherjee ............  H02M 7/483
                                                                 363/40
(Continued)

FOREIGN PATENT DOCUMENTS

EP    2 713 495 A2       4/2014
WO    WO 2014/082657 A1  6/2014
WO    WO 2016/037666 A1  3/2016

OTHER PUBLICATIONS

International Search Report, issued in PCT/EP2016/082109, dated Sep. 7, 2017.

(Continued)

*Primary Examiner* — Gary L Laxton
*Assistant Examiner* — Jye-June Lee
(74) *Attorney, Agent, or Firm* — Birch, Stewart, Kolasch & Birch, LLP

(57) ABSTRACT

A voltage source converter includes a number of converter modules, one for each of a number of phases, connected in-series between two DC terminals. Each converter module includes an upper director valve in series with a lower director valve, where a junction between the two provides a primary AC terminal, an upper wayshaper section, a common waveshaper block and a lower waveshaper section in parallel with the valves, where the upper and lower waveshaper sections include multilevel cells and the common waveshaper block include at least one common waveshaper connected between the upper and lower waveshaper sections, a first switching element connected between a secondary AC terminal and the upper waveshaper section and a second switching element connected between the secondary AC terminal and the lower waveshaper section.

20 Claims, 9 Drawing Sheets

(56) References Cited

U.S. PATENT DOCUMENTS

| | | | | |
|---|---|---|---|---|
| 2013/0272045 A1* | 10/2013 | Soeiro | ................... | H02M 7/487 |
| | | | | 363/131 |
| 2016/0218637 A1* | 7/2016 | Fan | ....................... | H02M 7/483 |
| 2017/0099013 A1* | 4/2017 | Martini | ................ | H02M 7/487 |
| 2018/0062537 A1* | 3/2018 | Wang | .................... | H02M 7/487 |
| 2018/0212533 A1* | 7/2018 | Nami | ................... | H02M 7/483 |
| 2018/0269803 A1* | 9/2018 | Soeiro | ................... | H02M 7/487 |

OTHER PUBLICATIONS

Tomasini et al., "DC-Link Voltage Ripple Minimization in a Modular Multilevel Voltage Source Converter for HVDC Power Transmission", Proceedings of the 2011-14th European Conference on Power Electronics and Applications (EPE 2011), Jan. 1, 2011, pp. 1-10, XP055212884.

Trainer et al., "A new Hybrid Voltage-Sourced Converter for HVDC Power Transmission". B4-111-2010, Cigre Session, Cigre, Paris, FR, Aug. 23, 2010, pp. 1-12, XP008134692.

Written Opinion of the International Searching Authority, issued in PCT/EP2016/082109, dated Sep. 7, 2017.

* cited by examiner

VOLTAGE SOURCE CONVERTER WITH IMPROVED OPERATION

FIELD OF INVENTION

The present invention generally relates to voltage source converters. More particularly the present invention relates to a voltage source converter comprising a number of converter modules with director valve phase legs in parallel with waveshaper phase legs.

BACKGROUND

Director valve based voltage source converters have recently been developed where there is a string of director valves connected in series between two Direct Current (DC) poles and a string of multilevel cells connected in parallel with this valve string. In this structure the director valves are used for directivity and the multilevel cells for waveshaping. A voltage source converter where the director valves are thyristors is for instance disclosed in WO2014/082657. In one embodiment of the document there are three parallel director valve phase legs and one waveshaper phase leg, where the midpoint of the waveshaper phase leg is connected to each of the midpoints via a series-circuit comprising a commutation cell and two bidirectional switches.

The structure is also disclosed as being used with all three Alternating Current (AC) phases provided through three such valve strings connected in series between two DC poles and three multilevel strings also connected in series between the two DC poles and in parallel with the valves. Thereby there are three converter modules, one for each phase, connected in series between the two poles, where each converter module comprises a director valve phase leg in parallel with a waveshaper phase leg. Furthermore, the director valve phase leg and waveshaper phase leg are both divided into an upper phase arm and a lower phase arm. Each phase arm is thus made up of half a phase leg. In this case a full-bridge cell in a waveshaper phase arm is used as a commutation cell for a corresponding director valve.

WO 2016/037666 also describes a structure with stacked converter modules.

When stacking converter modules between two DC poles in the above described way a waveshaper phase arm is typically used in a half-period of the waveshape that is formed. This means that the degree with which the cells are used in the waveshaper phase leg is fairly low. It would be of interest to improve on this situation.

SUMMARY OF THE INVENTION

The present invention is directed towards obtaining a director valve based voltage source converter where the cell use is increased.

This object is according to a first aspect of the present invention achieved through a voltage source converter connected between two DC terminals and a number of AC terminals for providing a number of phases of an AC voltage, the converter comprising:

a number of converter modules, one for each phase, connected in-series between the DC terminals, each converter module comprising a director valve phase leg comprising an upper director valve in series with a lower director valve, where a junction between the two director valves provides a primary AC terminal for a corresponding AC phase, a waveshaper phase leg connected in parallel with the director valve phase leg and comprising an upper wayshaper section, a common waveshaper block and a lower waveshaper section, where the upper and lower waveshaper sections comprise multilevel cells, wherein the common waveshaper block is connected in series with and between the upper and lower waveshaper sections and to a secondary AC terminal and comprising at least one common waveshaper connected between the upper and lower waveshaper sections, a first switching element connected between the secondary AC terminal and the upper waveshaper section and a second switching element connected between the secondary AC terminal and the lower waveshaper section.

The present invention has a number of advantages. It has a low cost, low losses, a better component usage ad and also a low footprint. Furthermore the converter rating and the number of cells is lowered compared with previous converters of the same type.

BRIEF DESCRIPTION OF THE DRAWINGS

The present invention will in the following be described with reference being made to the accompanying drawings, where FIG. 1 schematically shows a first variation of a voltage source converter with first, second and third stacked converter modules, FIG. 2 schematically shows the first converter module during the forming of a positive waveshape half, FIG. 3 schematically shows the first converter module during the forming of a negative waveshape half.

DETAILED DESCRIPTION OF THE INVENTION

In the following, a detailed description of preferred embodiments of the invention will be given.

Figure 1:
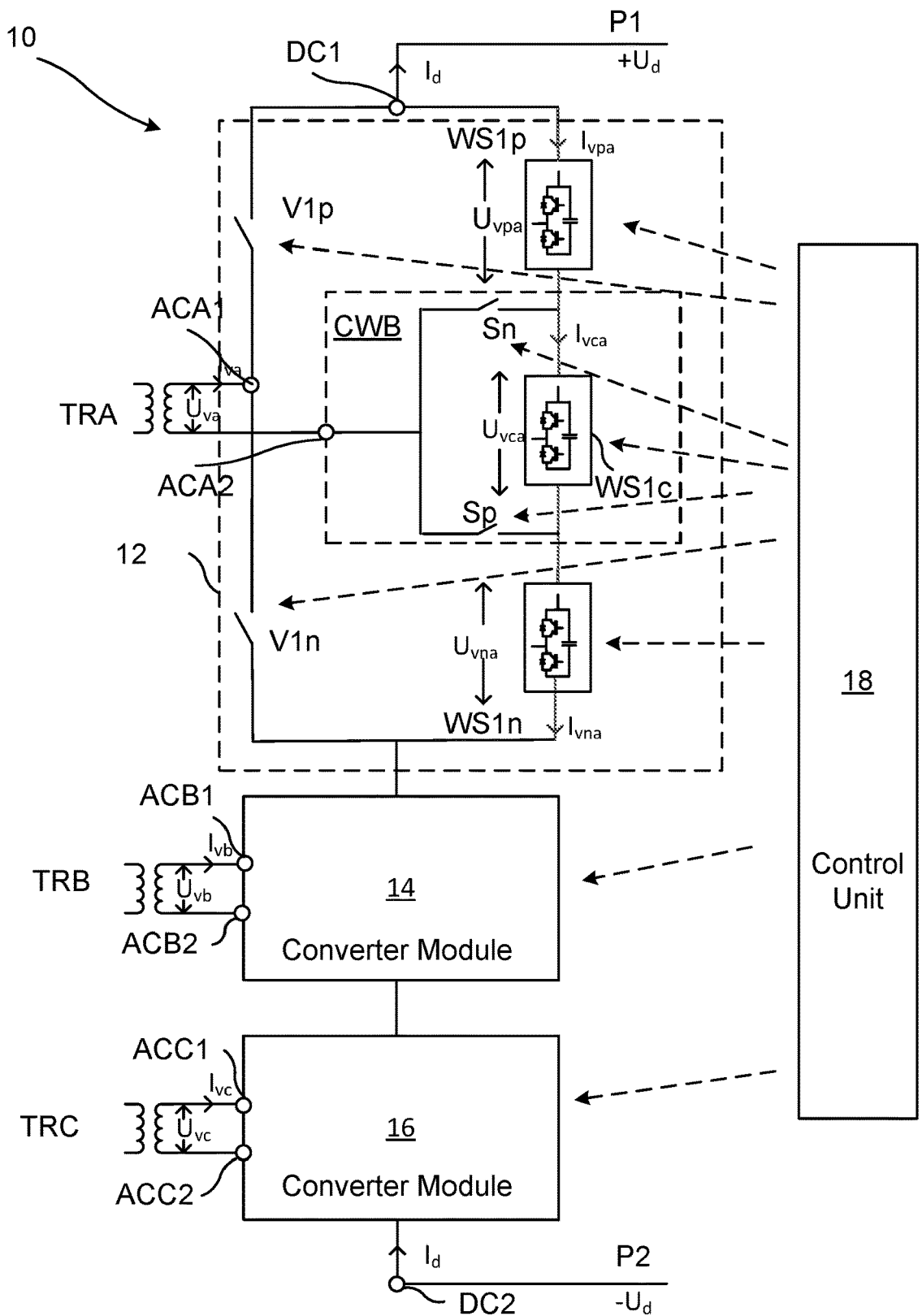

FIG. 1 shows a modular multilevel converter (MMC) 10 according to a first variation of the invention that is also a first embodiment. The converter 10 converts between Direct Current (DC) and Alternating Current (AC) and may with advantage be provided as an interface between a High Voltage Direct Current (HVDC) network and an AC network. The converter has two DC terminals DC1, DC2 and a number of AC terminals ACA1, ACA2, ACB1, ACB2, ACC1, ACC2 for providing a number of phases of an AC voltage.

Therefore, the converter 10 comprises a number of phase legs and in this example there are six phase legs associated with three phases. There are in this case three director valve phase legs and three waveshaper phase legs. These are furthermore provided in pairs, where a director valve phase leg and a waveshaper phase leg forms a pair and are connected in parallel with each other. There is therefore a pair of first phase legs, a pair of second phase legs and a pair of third phase legs, where each pair is provided for a corresponding AC phase. Consequently a pair of phase legs may also be considered to form a converter module for converting between AC and DC, where there are a number of converter modules, one for each phase, connected in series between a first and a second direct DC terminal DC1 and DC2. In FIG. 1 three such modules 12, 14, 16 are shown, where the first module 12 is provided for a first phase, phase A, a second module 14 is provided for a second phase, phase B, and a third module 16 is provided for a third phase, phase C. The DC terminals DC1 and DC2 are each connected to a corresponding (DC) pole P1 and P2, where a first pole P1 has a first voltage $+U_d$ and a second pole P2 has a second voltage $-U_d$. Also a DC current Id delivered to the first pole P1 is shown. It should be realized that as an alternative one of the DC terminals may be connected to ground instead.

In FIG. 1 only the details of the first converter module 12 is shown. It should be realized that the second 14 and third modules 16 have the same structure.

Each director valve phase leg comprises two valves: an upper valve V1p in series with a lower valve V1n, where the upper valve V1p is provided in an upper phase arm and the lower valve is provided in a lower phase arm. Thereby the director valves are likewise provided in pairs, where each pair forms a valve phase leg. The junction between two valve phase arms and thus between the two director valves furthermore provides a primary AC terminal for a corresponding AC phase. In FIG. 1, this primary AC terminal ACA1 of the first converter module 12 is connected to a first end of a secondary winding of a first transformer TRA.

There are a number of ways in which the director valves may be implemented. They may be implemented as antiparallel self-commutated components, such as two transistors, like Insulated Gate Bipolar Transistors (IGBTs) or Metal-Oxide-Semiconductor Field-Effect Transistor (MOSFETs), or Integrated Gate-Commutated Thyristors (IGCTS), using a self-commutated circuits with anti-parallel circuit-commutated circuits, such as an IGBT or IGCT together with a diode or thyristor, or as anti-parallel circuit commutated components, such as two anti-parallel thyristors or a thyristor with anti-parallel diode. They may also be realized only using diodes. A self-commutated component is here a component that may be directly turned off through receiving a control signal in order to stop conducting current, while a circuit-commutated component is a component needing an applied negative voltage to stop conducting current, for instance through the use of a dedicated circuit. As a thyristor is an example of one type of circuit commutated component, it can be seen that this type of circuit commutated component also has the ability of being directly turned on through receiving a control signal in addition to requiring an applied external negative voltage for being turned off. Moreover, a valve may be realized through a number of series-connected component combinations of the types described above.

The waveshaper phase leg in turn comprises two sections; an upper or positive waveshaper section WS1p and a lower or negative waveshaper section WS1n. Between these two sections there is furthermore an intermediate or common waveshaper block CWB comprising a common waveshaper WS1c. In the figure the voltage Uvpa across and the current Ivpa through the upper waveshaper section WS1p, the voltage Uvca across and the current Ivca through the common waveshaper WS1c and the voltage Uvna across and the current Ivna through the lower waveshaper section WS1n are also shown.

The upper and lower waveshaper sections Ws1p and Ws1n each comprise a string of multilevel cells. In the example in FIG. 1 each string is shown as only comprising one cell and the cells of the upper and lower waveshaper sections are half-bridge cells comprising an energy storage element in the form of a cell capacitor. The half-bridge cell is configured to either provide a zero voltage or a unipolar voltage corresponding to the voltage across the cell capacitor. It should be realized that as an alternative it is possible with full-bridge cells having an energy storage element and a zero and bipolar voltage contribution capability or a mixture of full-bridge and half-bridge cells. Also in the full-bridge cell the energy storage element is often a capacitor. As an alternative it may be a battery. The upper and lower waveshaper sections may thus comprise half-bridge cells and/or full-bridge cells.

As can be seen in FIG. 1 a first end of the upper waveshaper section WS1p is connected to the first DC terminal DC1 and delivers a DC current Id to the first pole P1.

The intermediate or common waveshaper block CWB in turn is connected in series with and between the upper and lower waveshaper sections WS1p, WS1n as well as to a secondary AC terminal ACA2 for the corresponding AC phase. As has been mentioned earlier, the common waveshaper block CWB comprises at least one common waveshaper WS1c for use in contributing to waveshaping performed by both the upper and lower waveshaper sections WS1p and WS1n. In the figure only one such common waveshaper WS1c is shown. This one or more common waveshapers WS1c is connected between the upper and lower waveshaper sections WS1p, WS1n and may be directly connected between the upper and lower waveshaper sections. A common waveshaper WS1c may be realized using a half-bridge cell, a full-bridge cell or an energy storage element, such as a capacitor. In the embodiment shown in FIG. 1 the common waveshaper WS1c is provided as a half-bridge cell. As is stated above there may be more than one cell in the common waveshaper block CWB.

In the common waveshaper block CWB there is furthermore a first and a second switch Sn and Sp. The first switch Sn, which may also be termed a negative switch, is connected between a second end of the upper waveshaper section WS1p and the secondary AC terminal ACA2 of the first phase. The second switch Sp, which may be termed a positive switch, is in turn connected between the secondary AC terminal ACA2 and a first end of the lower waveshaper section WS1n, the second end of which is connected to the next converter module, which in this case is the second converter module 14. Finally the secondary AC terminal ACA2 is connected to a second end of the secondary winding of the transformer TRA, the primary winding of which provides the first phase A of a three-phase AC voltage. Between the primary and secondary terminals ACA1 and ACA2 of the first converter module 12 there is also an AC voltage Uva and from the secondary winding there is delivered an AC current Iva into the primary connection terminal AC1.

The switches Sn, Sp may also be realized through the use of self-commutated or circuit-commutated components or as combinations of such components, all depending on which type of common waveshaper WS1c is used. In case the common waveshaper WS1c is an energy storage element, such as a capacitor, directly connected between the upper and lower waveshaper sections or is a half-bridge cell, then the switches may be realized as two anti-parallel self-commutated components or as self-commutated components with anti-parallel circuit commutated components, such as an IGBTs with anti-parallel diodes. However, in case the common waveshaper WS1c is a full-bridge cell, then it is possible to realize the switches as two anti-parallel circuit-commutated components, such as two anti-parallel thyristors.

It may here also be mentioned that in case the director valves are realized in the form of two anti-parallel circuit commutating components, then there has to be a full-bridge cell for turning off the upper valve V1p in either the upper waveshaper section WS1p or the common waveshaper block CWB. In a similar manner, there has to be a full-bridge cell for turning off the lower valve V1n in either the lower waveshaper section WS1n or the common waveshaper block CWB. A full-bridge cell in the common waveshaper block CWB may also be used for turning off both the upper and lower valves. Such a full-bridge cell may also be termed a commutation cell.

The waveshaper phase legs are connected in parallel with the director valve phase legs. This means that each waveshaper phase leg is connected in parallel with a corresponding director valve phase leg.

Thereby the director valve phase legs are connected in series. Also the waveshaper phase legs are connected in series between the two DC terminals DC1 and DC2. In the example given in FIG. 1, there are thus three director valve phase legs and three waveshaper phase legs and consequently also three AC phases.

As can be seen in FIG. 1, also the second and third converter modules 14 and 16 are connected to corresponding transformers TRB and TRC. It can also be seen that the voltages Uvb and Uvc between the AC terminals ACB1, ACB2 and ACC1, ACC2 and the currents Ivb, Ivc delivered to the primary terminals ACB1 and ACC1 are shown.

There is finally a control unit 18 set to control the different converter modules. In FIG. 1, the control unit 18 is shown as providing control signals (in the form of dashed arrows) to the upper director valve V1p, to the lower director valve V1n, to the upper waveshaper section WS1p, to the lower waveshaper section WS1n as well as to the common waveshaper WS1c and the first and second switches Sn and Sp of the common waveshaper block CWB. Similar control signals are sent to the second and third converter modules 14 and 16. However, as the details of these modules have been omitted, so has the control signals. Control is thereby indicated through one signal to each of the second and third modules 14 and 16. Also only one control signal is shown as being sent to a cell. It should be realized that typically a cell receives as many control signals as it has switches.

Furthermore in the converter 10 in FIG. 1, there may be provided a number of additional components and others may be removed. The AC terminals may, as is well known in the art, be connected to circuit breakers. It is also possible to remove the transformers. The director valve phase arms and upper and lower waveshaper sections may be connected to reactors at the DC terminals. There may also be reactors connected between the director valve phase arms, the waveshaper phase leg midpoint and the transformers. Furthermore, there may also be surge arresters connected in parallel between the two DC poles.

The converter 10 is in steady state controlled to provide a three phase AC voltage on the three pairs of AC terminals ACA1, ACA2, ACB1, ACB2, ACC1 and ACC2 and a first and second DC voltage on the two DC terminals DC1 and DC2.

In the forming of a waveshape the director valve provides the direction or polarity of the wave and the waveshaper sections the shape through suitable control of the cells in the waveshaper phase leg. It is thereby possible to for example form a sine wave on a pair of AC terminals.

Traditionally such control has always been done through the upper half of the waveshaper phase leg used to form the positive half period of a generated waveshape while a lower half of the waveshaper phase leg is used to form the negative half period of the waveshape.

Thereby the cell usage is limited as each energy storage element in the waveshaper phase leg is only used in one half-period. This also leads to the converter requiring a high rating and thereby the required number of cells is also high. The MMC cells with their energy storage elements are thus underutilized during the inactive period (period the valve arm is disconnected from AC network and connected to the DC side). 3 p.u. of inactive arm cells are available at any time and to maintain DC voltage even at zero available AC voltage 2 p.u. of inactive arms cells are good enough where p.u. denotes per unit and is a normalized AC voltage level.

The invention is provided for addressing at least some of these problems. The structure shown in FIG. 1 and variations of it may be used so that the common waveshaper is used together with the cells of the upper and lower waveshaper sections. It is for instance possible to use 1 p.u. of the waveshaper phase leg in both half-periods. By doing so, the waveshaper phase leg rating is reduced. This will also reduce the conduction losses, overall footprint and cost.

Figure 2:
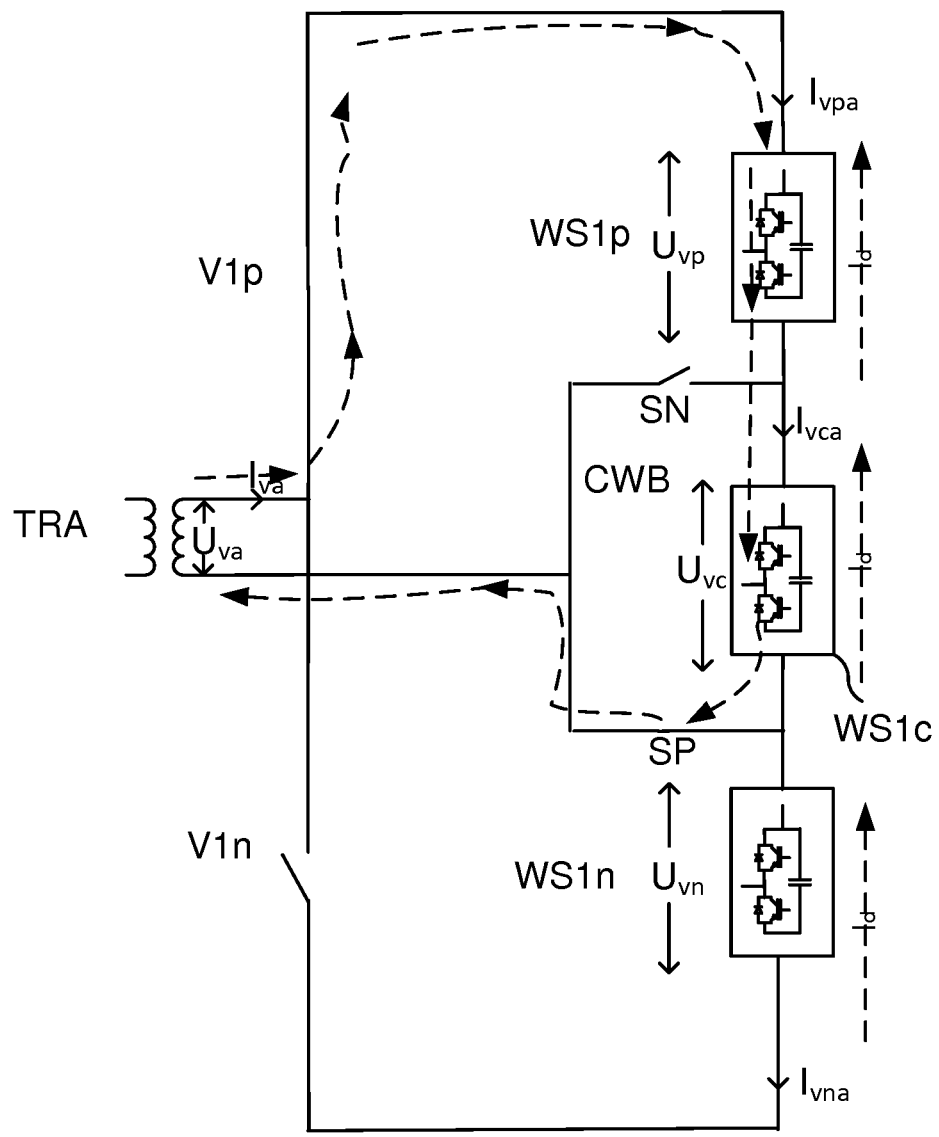
Figure 3:
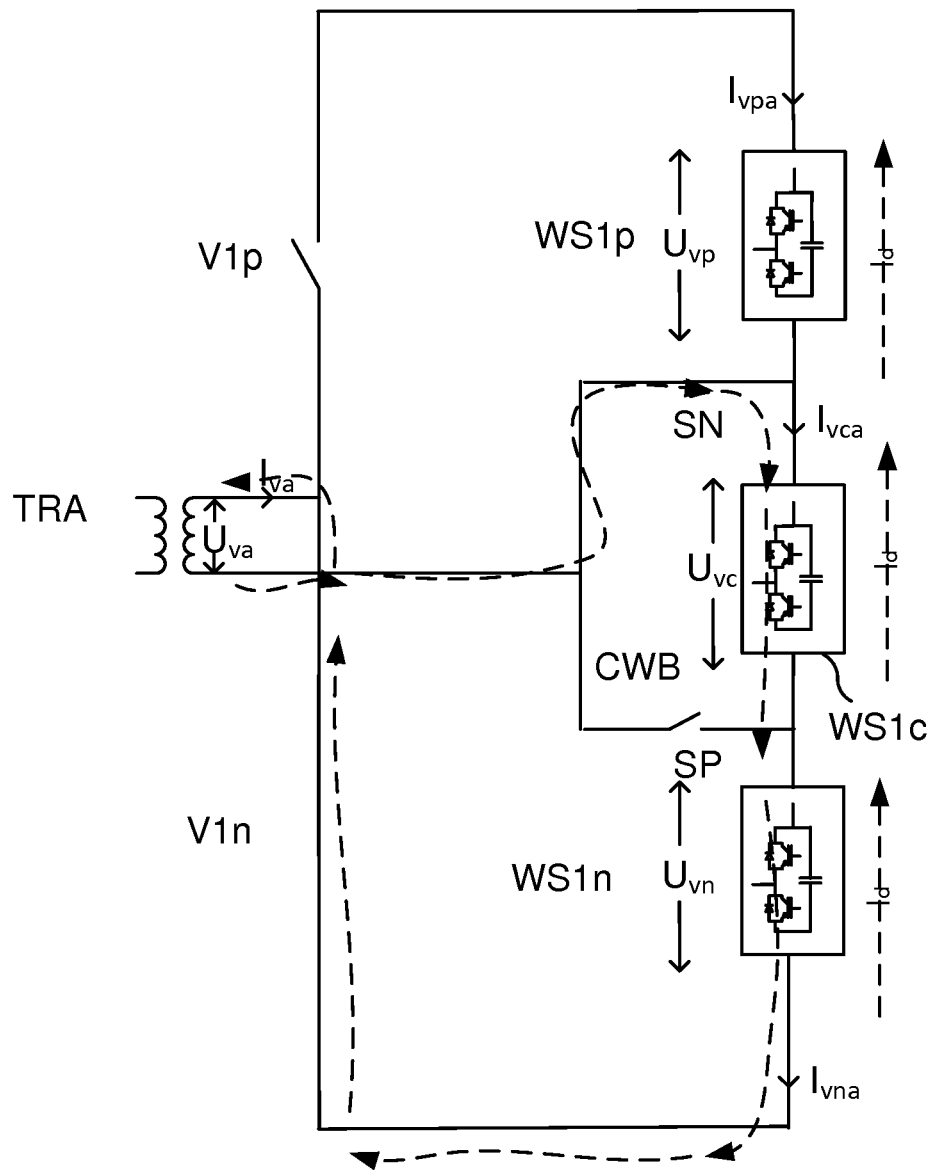

How operation may be carried out to achieve this will now be described with reference being made to FIGS. 2 and 3, where FIG. 2 schematically shows the first converter module 12 from FIG. 1 during the forming of a positive waveshape half and FIG. 3 schematically shows the first converter module during the forming of a negative waveshape half.

The control unit 18 controls the switches Sp, Sn to make the common waveshaper WS1c contribute to waveforming made in both the positive and negative half-cycle of a generated waveform. This means that during a positive half cycle or half-period of the voltage ($0 \leq \omega t \leq \pi$) the first director valve V1p and the second switch SP are turned ON. At the same time the second director valve V1n and the first switch SN are turned OFF. The cells of the upper waveshaper section WS1p and the cells of the common waveshaper WS1c are thereby controlled by the control unit 18 to produce the positive half period of the required waveshape. The lower waveshaper section WS1n will then supply the difference in the DC and AC sum voltage.

During the negative half cycle period ($\pi \leq \omega t \leq 2\pi$) the lower director valve V1n and the first switch SN are turned ON and the upper director valve V1p and second switch SP are turned OFF. The lower waveshaper section WS1n and the common waveshaper WS1c then produce the rectified AC voltage. The lower director valve V1n and the first switch SN will make sure the transformer winding sees this voltage in negative polarity. The cells of the lower waveshaper section are thus used together with the cells of the common waveshaper WS1c for forming the negative half-period of the waveshape. The positive valve arm will compensate for the difference DC and AC sum voltage, Moreover, the voltages obtained from the active waveshaper sections, i.e. the sections in all three phases that are used for forming the waveshapes, are summed for forming the DC voltage difference between the two poles P1 and P2.

Considering phase quantities $u_v=\hat{U}_v \sin(\omega t)$ and $i_v=\hat{I}_v \sin(\omega t-\emptyset)$ The three phase power=$3/2\hat{U}_v\hat{I}_v \cos(\emptyset)=P_{de}=2U_dI_d$ $2U_d$ is pole to pole DC voltage and equal to $2\hat{U}_v$ The DC current can be written as $$I_d = \frac{3}{4}\hat{I}_v \cos(\phi).$$

For $0 \leq \omega t \leq \pi$ $u_v = U_{vp} + U_{vc}$ $U_{vn} = U_d - (|U_{va}| + |U_{vb}| + |U_{vc}|)$ $i_{vp} = i_{vc} = i_v - I_d$ $i_{vn} = -I_d$ For $\pi \leq \omega t \leq 2\pi$ $-u_v = U_{vn} + U_{vc}$ $U_{vp} = U_d - (|U_{va}| + |U_{vb}| + |U_{vc}|)$ $i_{vn} = i_{vc} = i_v - I_d$ $i_{vp} = -I_d$ The waveshaper AC power and the DC power will be naturally balanced if the DC voltage of the converter section is equal to average Uv sum, i.e. equal to the average of the sum of the voltages uvp, uvc and uvn. As the AC and DC quantities are decoupled using the inactive waveshaper section the power balance in a common wavewshaper shall occur within a complete cycle.

Power balance in a common or shared waveshaper will occur naturally if the DC voltage is equal to the rectified AC voltage sum ($U_d=3/\pi\hat{U}_v$). If they are not the same, power balance is not straight forward as the common waveshaper is in operation for the entire period.

The voltage contribution of the common waveshaper block should be changed to balance the power. The control unit 18 therefore controls the switches Sn, Sp of the common waveshaper block CWB to balance the power between the positive and negative half-cycle.

Figure 4A:
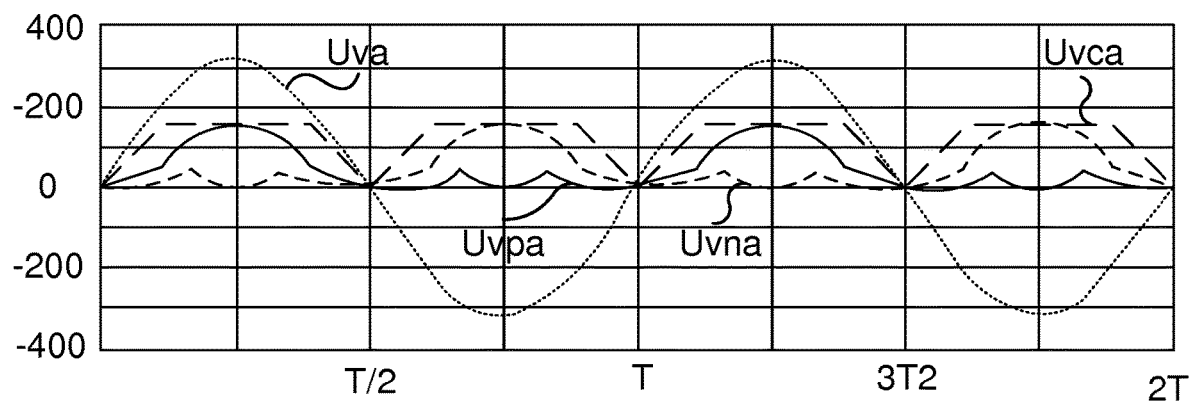
FIGS. 4A and 4B show output and waveshaper section voltages and currents of the first converter module, FIG. 5 schematically shows the first converter module in a second variation of the converter during the forming of a positive waveshape half, FIG. 6 schematically shows the first converter module of the second converter variation during the forming of a negative waveshape half, FIG. 7 schematically shows the first converter module in a third variation of a converter during the forming of a positive waveshape half, FIG. 8 schematically shows the first converter module of the third converter variation during the forming of a negative waveshape half, and FIG. 9 schematically shows the first converter module in a fourth variation of a converter during the forming of a positive waveshape half.
Figure 4B:
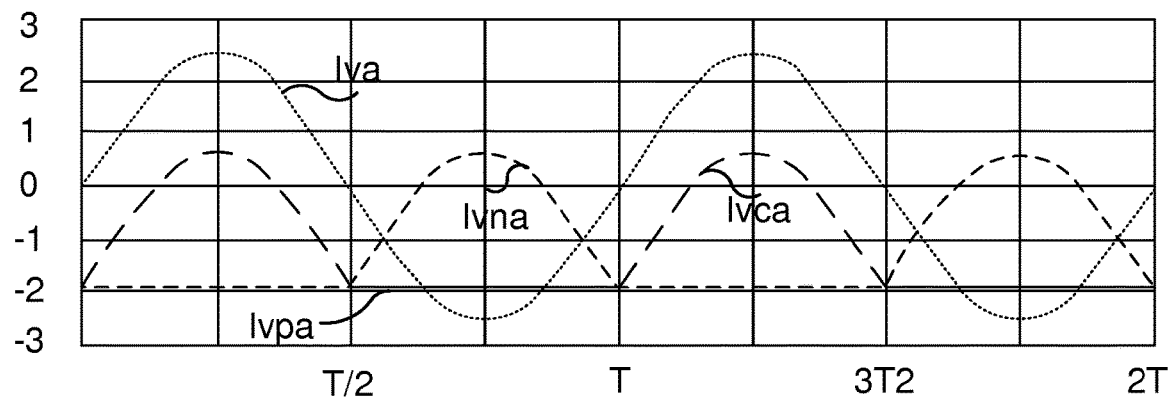

How this control may be done can be seen in FIG. 4a which shows the converter output voltage Uva, the upper waveshaper section voltage Uvpa, the common waveshaper voltage Uvca and the lower waveshaper section voltage Uvna of the first converter module, while FIG. 4b shows the converter output current Iva, the upper waveshaper section current Ivpa, the common waveshaper current Ivca and the lower waveshaper section current Ivna of the first converter module for an operating condition ($U_d=\hat{U}_v$ and $\emptyset=0$). As can be seen in the figures the voltage of and the current through the common waveshaper is the same in the different half-periods and thereby power balance is obtained. The same insertion pattern of the voltage Uvca is thus used in both half-periods.

At very low AC voltages, only the upper wayshaper section and lower waveshaper sections are switched to produce AC voltage most of the time. To have power balance in the common waveshaper block it is switched for short duration.

The fault behavior of the proposed topology is expected to be similar to the known topology where two waveshaper phase arms are used. If the Director Valve arm is based on self-commutated components, there is no capability to handle fault currents. Thyristor bypass may then be provided for protection.

Figure 5:
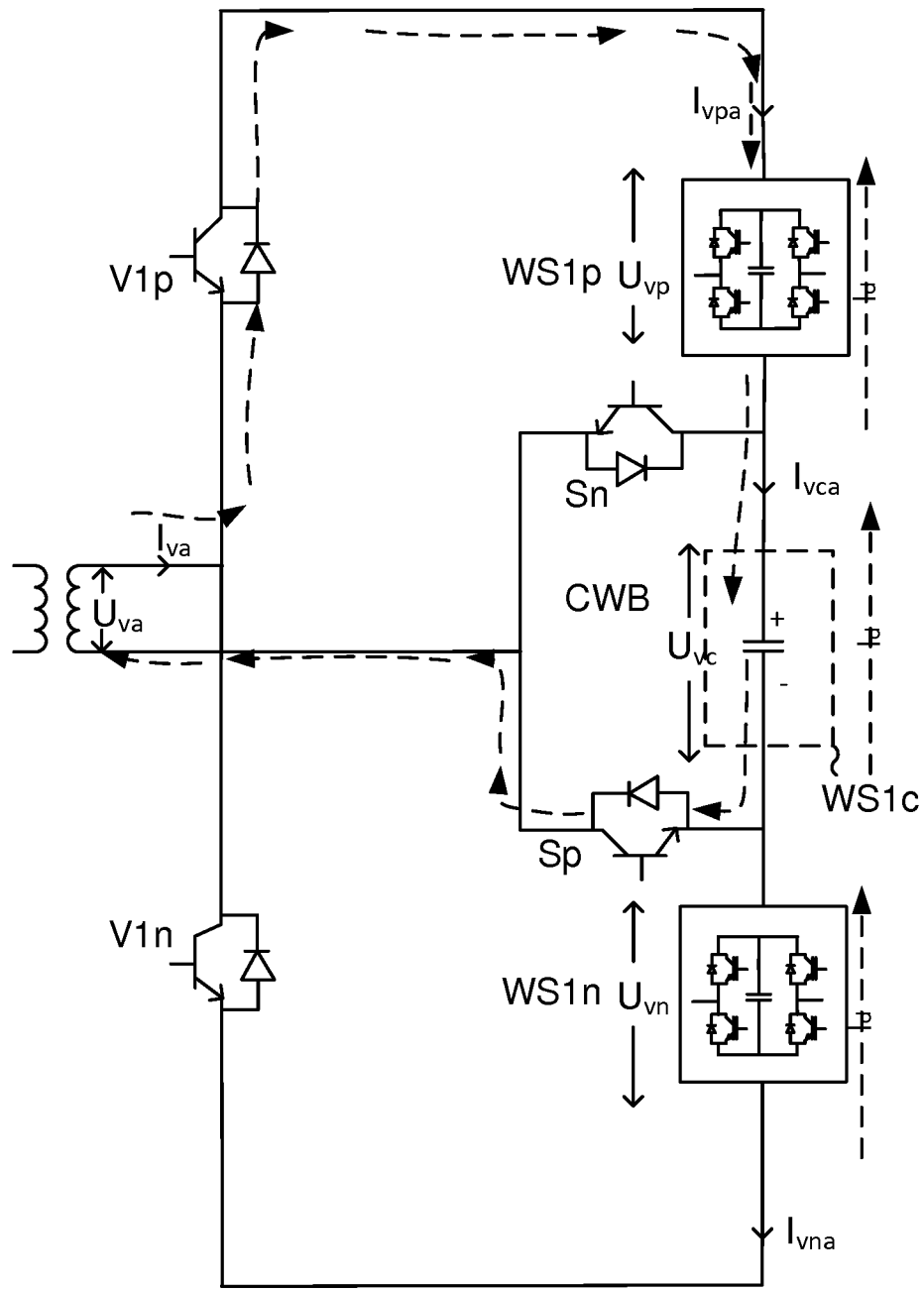
Figure 6:
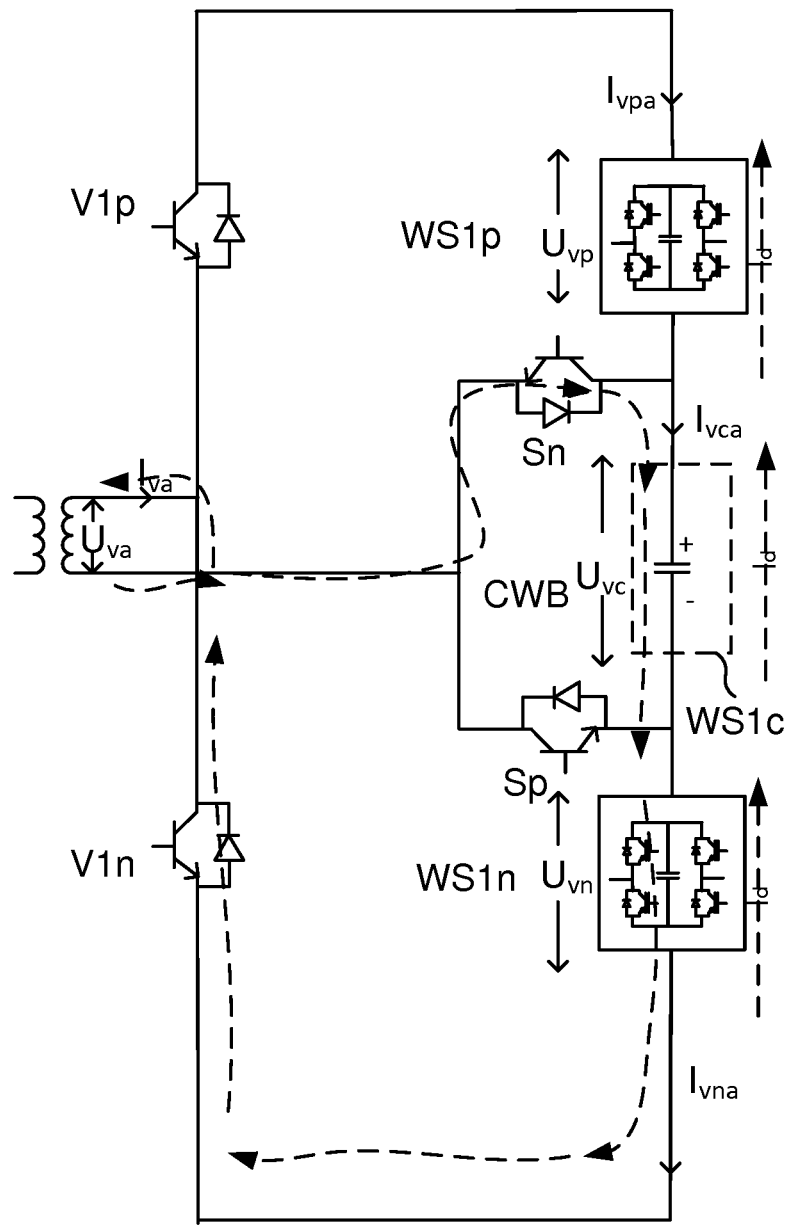

As indicated above, there are several possible variations of the converter module. One first variation of the first converter module 14, which is used in a second embodiment of the converter, is shown in FIGS. 5 and 6, where FIG. 5 shows the first converter module during the forming of a positive waveshape half and FIG. 6 schematically shows the same converter module during the forming of a negative waveshape half.

As can be seen in this embodiment the common waveshaper block CWB only comprises switches and an energy storage element in the form of a capacitor, where the capacitor forms the common waveshaper WS1c and is directly connected between the upper and lower waveshaper sections. The capacitor thus has a first end permanently connected to the second end of the upper wavehaper section WS1p and a second end permanently connected to the first end of the lower waveshaper section WS1n. It can also be seen that both the director valves Vip and V1n as well as the switches Sn and Sp are realized as transistors with antiparallel diodes. It can also be seen that the cells in the upper and lower waveshaper sections WS1p and WS1n are full-bridge cells. As can also be seen, the operation is the same as in the first embodiment.

The realization using a capacitor instead of a cell is possible because both the director valves V1p and V1n and the switches Sn and Sp are realized using self-commutated components. This allows the rating to be lowered as well as reduces losses in the converter.

Figure 7:
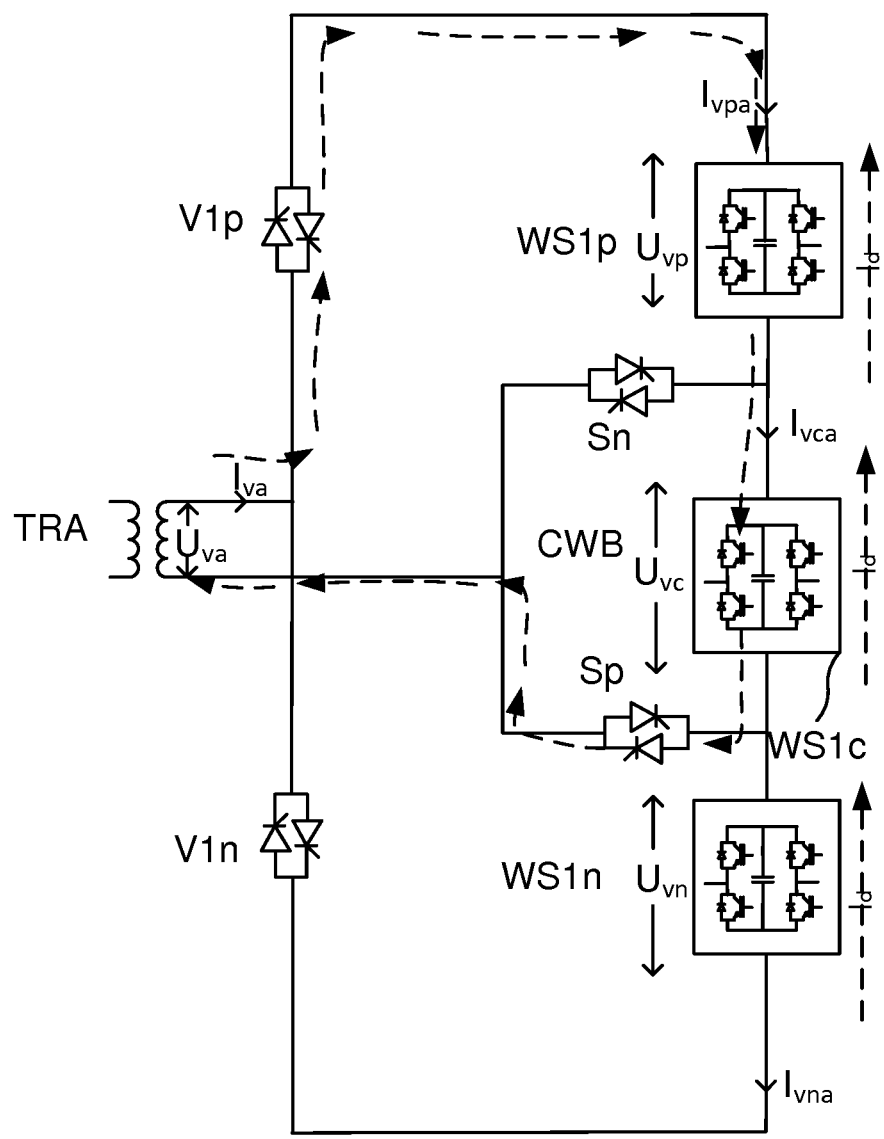
Figure 8:
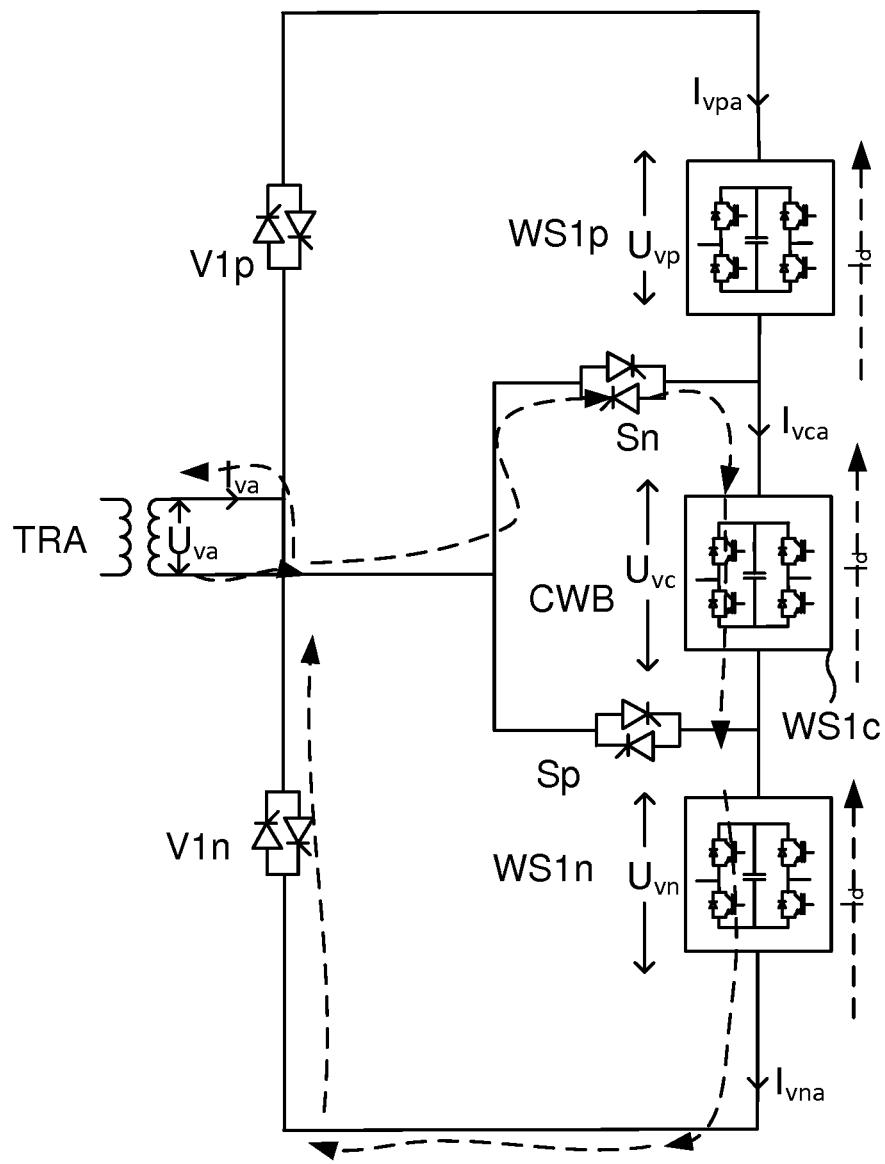
Figure 9:
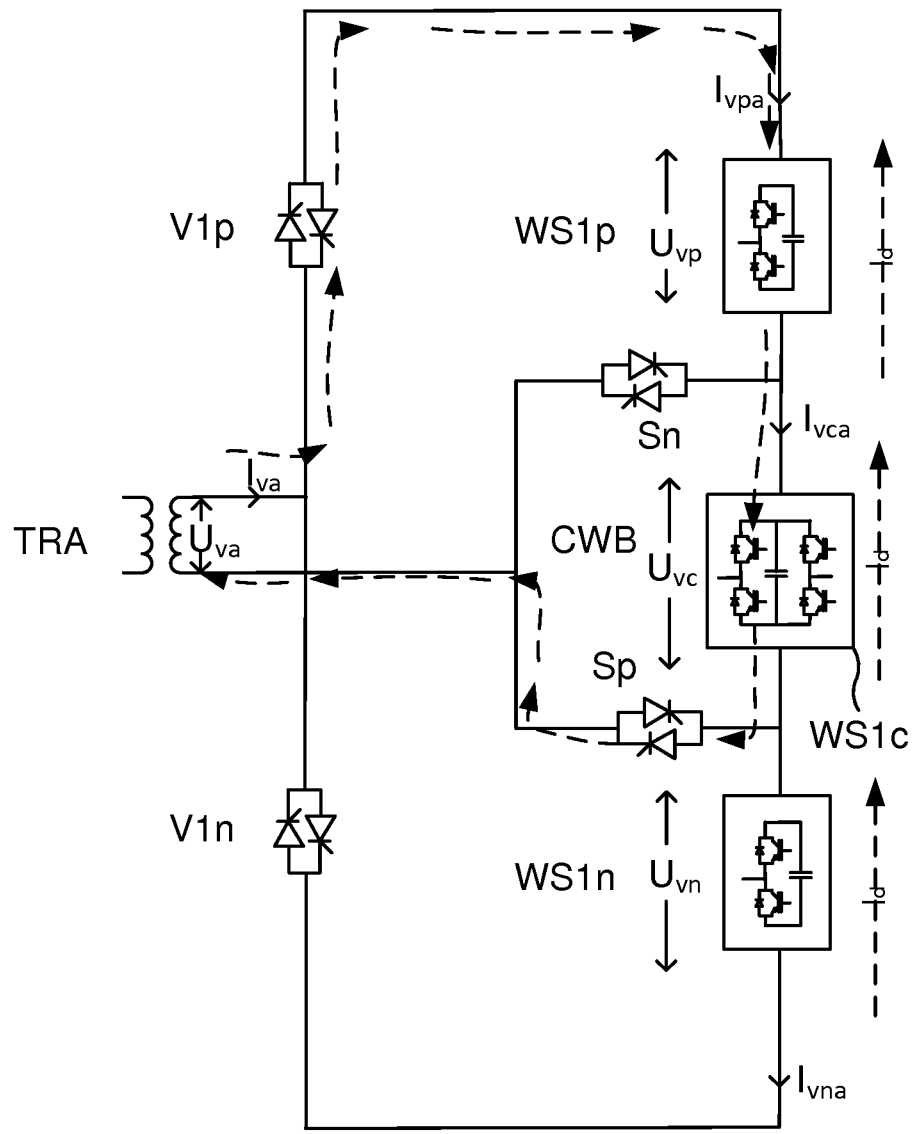

Another converter module variation, which is also used in a third embodiment of the converter, is shown in FIGS. 7 and 8, where FIG. 7 shows the first converter module 12 according to this third embodiment during the forming of a positive waveshape half and FIG. 8 schematically shows the same converter module during the forming of a negative waveshape half.

As can be seen in this embodiment the common waveshaper WS1c is realized using a second type of converter cell in the form of a full-bridge cell. It can also be seen that the upper and lower waveshaper sections WS1p and WS1n comprise full-bridge cells. Moreover, it can also be seen that both the director valves V1p and V1n as well as the switches Sp and Sn are realized through anti-parallel circuit commutated components, which in this case are bidirectional thyristors, i.e. pairs of anti-parallel thyristors. Here the full-bridge cell forming the common waveshaper WS1c is used as a commutation cell for both the first and the second switch Sn and Sp. When such a switch is to be turned off, the control unit 18 controls the cell to apply a negative voltage across the switch, and thereby it is turned off. In a similar manner a full-bridge cell in the upper waveshaper section WS1p is used to turn off the upper director valve V1p and a cell in the lower waveshaper section WS1n is used to turn off the lower director valve V1n.

The use of thyristors in the director valves has the advantage of reducing the conduction losses of the converter.

In this case it is also possible to control the common waveshaper voltage in a square wave mode with some blank time so that the outgoing thyristors get enough time to turn off.

Yet another variation, which is also a fourth embodiment, is shown in FIG. 10. This embodiment is in many respects similar to the third embodiment and shows the first converter module during the forming of a positive waveshape half. It differs from the third embodiment through the upper and lower waveshaper sections comprising half-bridge cells. The full-bridge cell as common waveshaper WS1c is in this embodiment used to turn off the director valves V1p and V1n in addition to the first and second switches Sn and Sp.

This embodiment has the advantage of low conduction losses together with a saving in the number of components. Essentially only one full-bridge cell is needed for commutation purposes.

Generally the invention has a number of advantages. It has a low cost, low losses and also a low footprint. Furthermore the converter rating and the number of cells is lowered compared with previous converters of the same type. The conduction losses are lowered even in the case of the use of a capacitor.

As can be seen above the converter may be varied in multiple ways. The switches and director valves may thus be either self-commutated components, circuit commutated components or combinations of such components. The upper and lower waveshaper sections can be composed of cascaded half-bridge cells, cascaded full-bridge cells.

With different combinations of director valve devices different possible combinations of upper and lower waveshaper sections might be selected that best suits the type of director valve selected.

The control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a processor performing the role of control unit of the voltage source converter.

The commutation cell was above described as being a full-bridge cell. It should however be realized that it may in some instances be a half-bridge cell.

From the foregoing discussion it is evident that the present invention can be varied in a multitude of ways. It shall consequently be realized that the present invention is only to be limited by the following claims.

The invention claimed is:

1. A voltage source converter connected between two DC terminals and a number of AC terminals for providing a number of phases of an AC voltage, the converter comprising:
   a number of converter modules, one for each phase, connected in-series between the DC terminals, each converter module comprising:
   a director valve phase leg comprising an upper director valve in series with a lower director valve, where a junction between the upper director valve and the low director valve provides a primary AC terminal for a corresponding AC phase; and
   a waveshaper phase leg connected in parallel with the director valve phase leg and comprising an upper waveshaper section, a common waveshaper block and a lower waveshaper section,
   wherein the common waveshaper block is connected in series with and between the upper and lower waveshaper sections and to a secondary AC terminal and comprises at least one common waveshaper connected between the upper and lower waveshaper sections, a first switching element connected between the secondary AC terminal and the upper waveshaper section and a second switching element connected between the secondary AC terminal and the lower waveshaper section.

2. The voltage source converter according to claim 1, wherein cells in the upper and lower waveshaper sections comprise half-bridge cells.

3. The voltage source converter according to claim 2, wherein the upper director valve and the low director valve comprise self-commutated components.

4. The voltage source converter according to claim 3, wherein the common waveshaper comprises at least one converter cell connected between the upper and lower waveshaper sections.

5. The voltage source converter according to claim 2, wherein cells in the upper and lower waveshaper sections comprise full-bridge cells.

6. The voltage source converter according to claim 2, wherein the common waveshaper comprises at least one converter cell connected between the upper and lower waveshaper sections.

7. The voltage source converter according to claim 1, wherein cells in the upper and lower waveshaper sections comprise full-bridge cells.

8. The voltage source converter according to claim 7, wherein the upper director valve and the low director valve comprise anti-parallel circuit commutated components.

9. The voltage source converter according to claim 8, wherein the common waveshaper comprises an energy storage element having a first end permanently connected to the upper waveshaper section and a second end permanently connected to the lower waveshaper section.

10. The voltage source converter according to claim 8, wherein the common waveshaper comprises at least one converter cell connected between the upper and lower waveshaper sections.

11. The voltage source converter according to claim 7, wherein the common waveshaper comprises an energy storage element having a first end permanently connected to the upper waveshaper section and a second end permanently connected to the lower waveshaper section.

12. The voltage source converter according to claim 7, wherein the common waveshaper comprises at least one converter cell connected between the upper and lower waveshaper sections.

13. The voltage source converter according to claim 1, wherein the common waveshaper comprises at least one converter cell connected between the upper and lower waveshaper sections.

14. The voltage source converter according to claim 13, wherein the at least one converter cell comprises a half-bridge cell.

15. The voltage source converter according to claim 13, wherein the at least one converter cell comprises a full-bridge cell.

16. The voltage source converter according to claim 15, wherein the first switching element and the second switching element comprise anti-parallel circuit commutated components.

17. The voltage source converter according to claim 16, wherein the antiparallel circuit commutated components are circuit commutated components capable of being turned on.

18. The voltage source converter according to claim 1, wherein the first switching element and the second switching element comprise self-commutated components.

19. The voltage source converter according to claim 1, further comprising a control unit configured to control the first switching element and the second switching element to make the common waveshaper contribute to waveforming made in both a positive and negative half-cycle of a generated waveform to generate required AC voltage.

20. The voltage source converter according to claim 19, wherein the control unit is configured to control the first switching element and the second switching element of the common waveshaper block to balance power between the positive and negative half-cycle of the generated waveform in the common waveshaper.

* * * * *